April 29, 1941.   F. H. BROMSCHWIG   2,239,951
COLLAPSIBLE CAMPING STRUCTURES
Filed April 10, 1939   3 Sheets-Sheet 1

INVENTOR
FRED H. BROMSCHWIG
BY
ATTORNEY

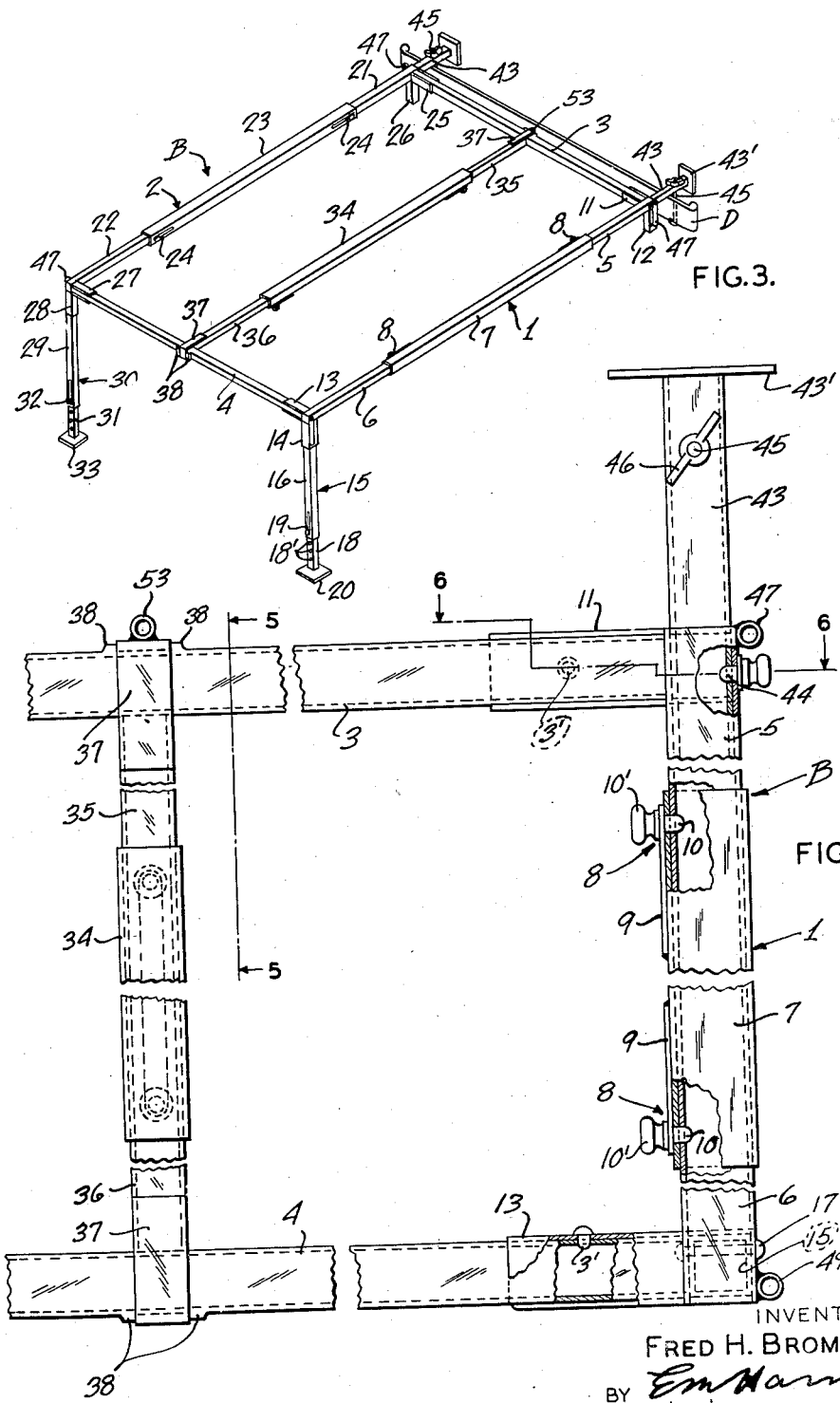

April 29, 1941.  F. H. BROMSCHWIG  2,239,951
COLLAPSIBLE CAMPING STRUCTURES
Filed April 10, 1939  3 Sheets-Sheet 3
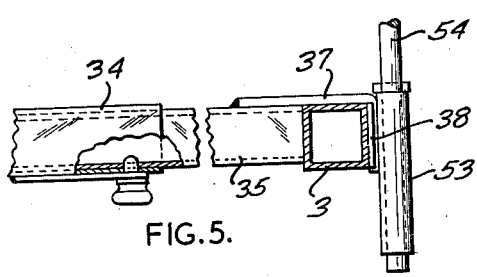
FIG. 5.
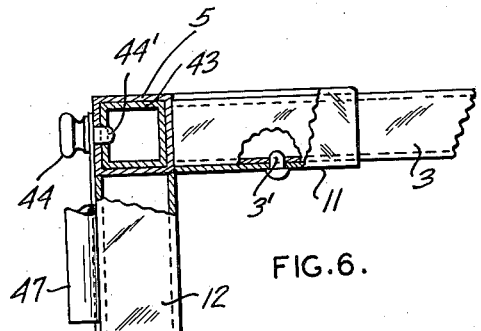
FIG. 6.
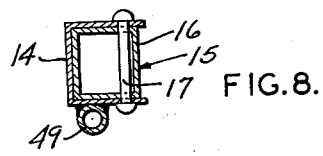
FIG. 8.
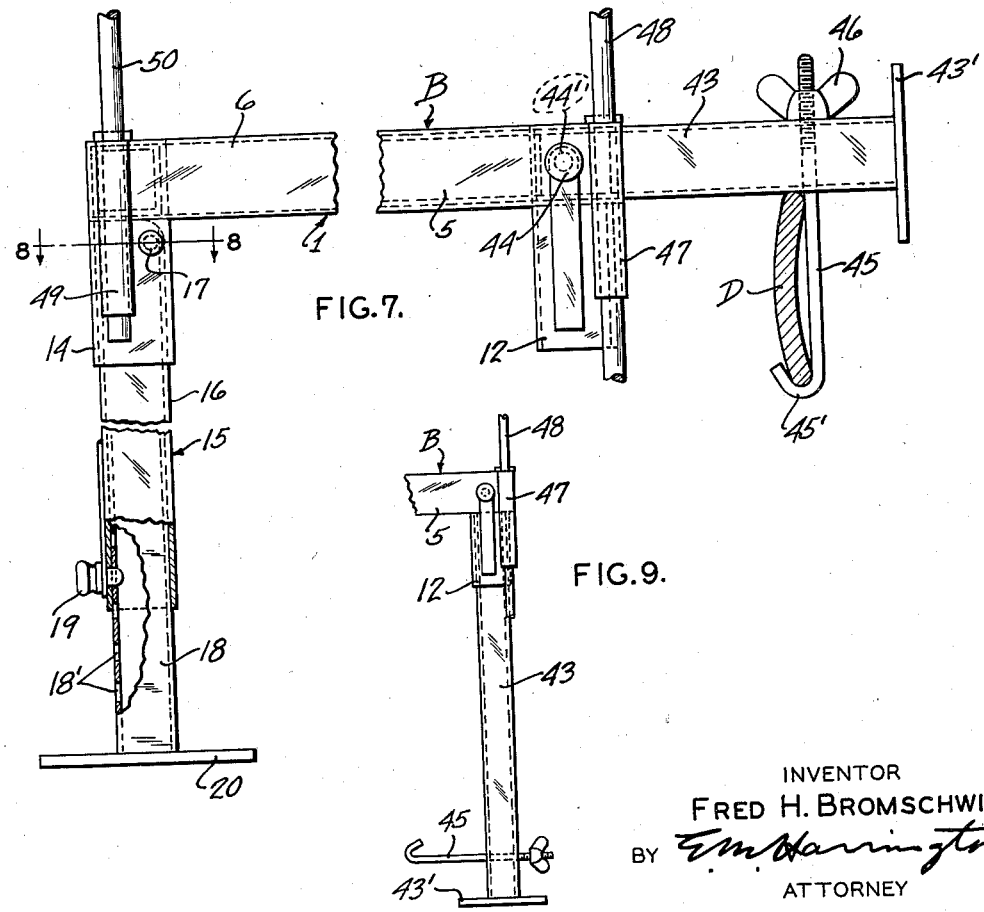
FIG. 7.
FIG. 9.
INVENTOR
FRED H. BROMSCHWIG
BY
ATTORNEY Patented Apr. 29, 1941

2,239,951

UNITED STATES PATENT OFFICE 2,239,951

COLLAPSIBLE CAMPING STRUCTURE

Fred H. Bromschwig, St. Louis, Mo.

Application April 10, 1939, Serial No. 266,992

3 Claims. (Cl. 5—119)

This invention relates generally to camping structures of the type adapted for association with motor vehicles and intended to provide sleeping accommodations for occupants of the motor vehicles at night and during rest periods of journeys made with the motor vehicles, and more specifically to such a structure which includes a cot which has a protective tent associated therewith, the predominant object of the invention being to provide a combined cot and tent structure which may be quickly and conveniently associated with a motor vehicle for use, and which may be easily and conveniently converted to a collapsed or knock-down condition when not in use for storage in a small space provided by the motor vehicle.

Fig. 3 is a perspective of the cot portion of the improved camping structure with the tent and the tent-supporting elements removed therefrom.

Fig. 4 is a fragmentary plan view of the cot frame of the improved structure with parts thereof shown in section.

Fig. 5 is a vertical, fragmentary section on line 5—5 of Fig. 4 with parts shown in elevation and with a part shown in elevation broken away to illustrate a portion thereof in section.

Fig. 6 is a vertical, fragmentary section on line 6—6 of Fig. 4 with parts shown in elevation and with a part shown in elevation broken away to illustrate a portion thereof in section.

Fig. 7 is a fragmentary side elevation of the improved structure showing the manner of attaching same to a bumper of a motor vehicle, a part of the structure and the bumper of the motor vehicle being shown in section.

Fig. 8 is a horizontal section taken on line 8—8 of Fig. 7.

Fig. 9 is a fragmentary elevation of an end portion of the structure showing the manner in which a part of the structure which is adapted to be secured to a bumper of a motor vehicle may be employed as a leg of the structure when desired.

Figure 1:
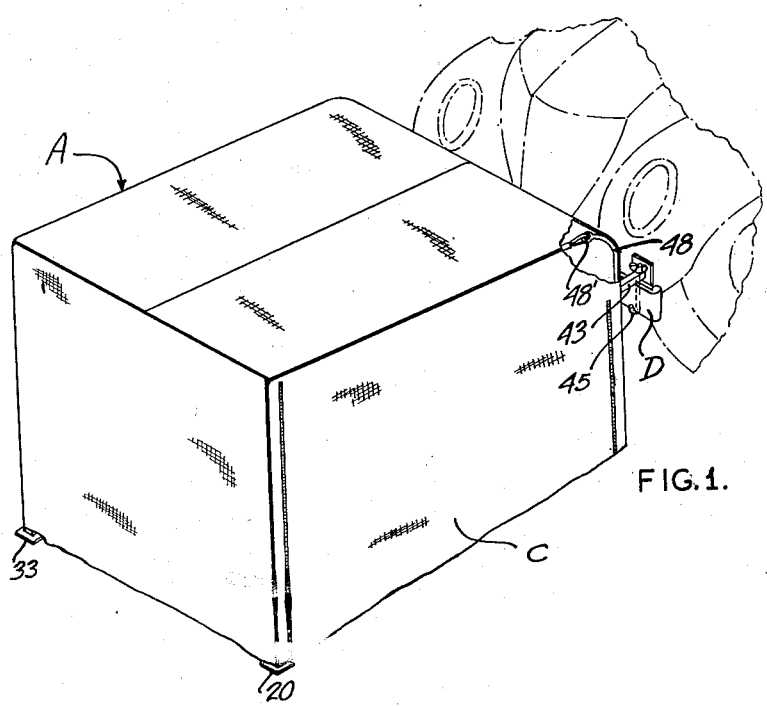
Fig. 1 is a perspective illustrating the improved camping structure in association with a motor vehicle.

In the drawings, wherein is shown for the purpose of illustration, merely, one embodiment of the invention, A designates in Fig. 1 the improved camping structure generally, said structure comprising a cot B and a tent C. The cot B of the camping structure A is provided with opposed side frame assemblies 1 and 2 and end bars 3 and 4 all of which are so related and disposed as to provide a rectangular cot frame. The side frame assembly 1 is made up of opposed bars 5 and 6, which preferably though not necessarily, are of tubular form and rectangular in cross-section, and the inner, or adjacent, end portions of the bars 5 and 6 are disposed within a slightly larger tubular element 7 in telescopic relation with respect thereto.

In order to lock the bars 5 and 6 against unintended longitudinal movement relative to the tubular element 7, a pair of locking elements 8 is provided as shown to the best advantage in Fig. 4. Each of these locking elements comprises a flat strip of resilient material 9 which is secured by welding, or otherwise, at one end to the tubular element 7, and at its other end has fixed thereto a locking pin 10 which is adapted to extend through alined apertures formed in the wall of the tubular element 7 and in the wall of the bar 5 or the bar 6. Also each locking element 8 is provided with a knob 10' which may be grasped to withdraw the pin 10 from the apertures formed in the tubular element 7 and the bar 5 or 6 when it is desired to move a bar relative to the tubular element.

The bar 5 forms a part of an angular corner structure of the cot frame which includes a portion 11 that extends at an approximate right angle with respect to the bar 5, said bar 5 and said portion 11 being in substantially the same horizontal plane. The portion 11 is substantially U-shaped in vertical section, being provided with a bottom wall and opposed side walls but being open at its top as shown in Fig. 4. The angular corner structure of which the bar 5 and the portion 11 form parts includes also a hollow extension 12, this hollow extension being disposed in a vertical plane as shown in Figs. 2, 3, 6, 7, and 8. Also with respect to the corner structure of which the bar 5, portion 11, and extension 12 form parts, it is pointed out that the hollow interior of the bar 5 is open at the end face of the corner structure.

Going now to the opposite end of the side frame assembly 1 of the cot B it will be noted that the bar 6 forms a part of an angular corner structure which includes a portion 13 which is extended at an approximate right angle relative to said bar 6 in substantially the same horizontal plane therewith, and an extension 14 which is disposed in a vertical plane. Like the portion 11 of the angular corner structure at the opposite end of the side frame assembly 1, the portion 13 is substantially U-shaped in cross-section; however unlike the portion 11 which is open at the top, the portion 13 is open at its outward face. The extension 14 is also substantially U-shaped in cross-section as shown to the best advantage in Fig. 8 with its open side facing toward the opposite end of the cot.

Pivotally attached to the extension 14 is a leg 15 which includes a tubular portion 16 whose upper portion is disposed between the opposed side walls of the extension 14, said pivotal attachment between said leg and said extension being provided by a pivot pin 17 which extends through apertures formed through said opposed webs of said extension and through portions of said portion 16 of said leg 15. The leg 15 includes also an adjustable lower portion 18 which is arranged in telescopic relation with respect to the portion 16, said leg portion 18 being provided with a plurality of apertures 18' which are adapted to receive the pin of a locking element 19 fixed to the leg portion 16, which is constructed and arranged as heretofore described in connection with the locking element 8. By providing the leg portion 18 with a plurality of apertures as described, said leg portion may be adjusted longitudinally of the leg portion 16 and locked in positions to which it is adjusted to provide a leg of the desired length. If desired the leg 15 may be provided with a foot plate 20 to prevent sinking thereof into soft ground.

The opposite side frame assembly 2 of the cot B is constructed and arranged just as has been described in connection with the side frame assembly 1. In other words the side frame assembly 2 includes opposed bars 21 and 22 whose inner, or adjacent, end portions are arranged in telescopic relation with respect to a tubular element 23. Also the tubular element 23 has associated therewith locking elements 24 adapted to lock said bars and said tubular element against unintended relative longitudinal movement, these locking elements 24 being constructed and arranged in accordance with the locking elements 8 hereinbefore described. Additionally at one end of the side frame assembly 2 the bar 21 forms a part of an angular corner structure that includes a portion 25 which is extended at an approximate right angle with respect to the bar 21 and in substantially the same horizontal plane therewith, and a hollow, vertically projected extension 26, said portion 25 being U-shaped in cross-section and being open at its top. Furthermore, like the bar 5, the bar 21 is hollow and the hollow interior thereof is open at the end face of the angular corner construction.

At the opposite end of the side frame assembly 2 the bar 22 forms a part of an angular corner construction which includes also a portion 27, which is extended at an approximate right angle relative to said bar 22 in substantially the same horizontal plane therewith, and a vertically disposed extension 28. The portion 27, like the portion 13 of the corner structure at the opposite side of the cot, is U-shaped in cross-section and said portion is open at its outer side. Additionally the extension 28, which is U-shaped in cross-section, receives the upper portion of an element 29 of a leg 30 and said leg is pivotally attached to said extension by a pivot pin 30' in the manner heretofore described in connection with the pivotal attachment of the leg 15. The leg 30 is provided with a lower portion 31 which is arranged in telescopic relation with respect to the leg portion 29 so that said portion 31 may be adjusted longitudinally of the leg portion 29 to increase or decrease the length of the leg 30, said leg portion 29 having associated therewith a locking element 32, similar to the locking element 8 hereinbefore described, the pin of which enters one of a plurality of apertures formed in the leg portion 31 to lock the leg portion 31 in various positions to which it is adjusted. The leg portion 31 is provided with a foot plate 33 which serves to prevent sinking of the lower end portion of said leg portion in soft ground.

The end bar 3 of the cot structure is assembled in place in the structure by having its opposite end portions disposed in the pockets provided therefor by the U-shaped portions 11 and 25, said opposite end portions of said end bar 3 being moved downwardly into said portions through the open tops thereof. Also the end bar 4 is arranged in assembled relation with respect to the remainder of the cot structure by having its opposite end portions disposed in the pockets provided by the U-shaped portions 13 and 27 by moving said end portions of said bar through the open, outer faces of said portions. If desired the portions 11, 25, and 13, and 27 may have pins 3' associated therewith as shown in Fig. 6 which will prevent relative longitudinal movement of said portions and the end bars 3 and 4.

The cot structure of the improved camping structure preferably is in the form of a double cot adapted to the use of two persons and said cot structure includes a center bar assembly which extends longitudinally of the cot from end to end thereof. The center bar assembly includes a tubular element 34 into the opposite ends of which the inner end portions of opposed bars 35 and 36 are telescopically extended. The outer ends of the opposed bars 35 and 36 abut against the inner faces of the end bars 3 and 4 and at the outer ends of said bars 35 and 36 metallic strips 37 are secured thereto by welding or otherwise. Each of the strips 37 is substantially L-shaped in formation with the long leg thereof being secured to the associated bar 35 or 36 and extending over the top face of the end bar 3 or 4 in contact therewith. The shorter leg of each of the L-shaped strips extends downwardly in contact with the outer face of the associated end bar 3 or 4, and these shorter legs of said strips are disposed between pairs of lugs 38 which are formed on, or secured to, the end bars 3 and 4 so as to prevent movement of the center bar assembly longitudinally of the end bars 3 and 4.

The cot of the improved camping structure disclosed herein includes a support 39 formed of canvas or other suitable material of the proper dimensions to extend from side to side and end to end of the cot frame. The opposite side portions of the material of which the support 39 is formed is turned under the opposed side frame assemblies 1 and 2 of the cot and are stitched to the main body of the support to secure said support to said side frame assemblies as shown at 40 in Fig. 2. Likewise the opposite end portions are turned under and are stitched to the main body of the support to provide elongated pockets which are adapted to receive the end bars 3 and 4 as shown at 41 in Fig. 2. Additionally a strip of material 42 is stitched along its side marginal edges to the support 39 at the lower face thereof, as shown in Fig. 2, to provide a pocket adapted to receive the center bar assembly of the cot structure.

In order to attach the cot structure of the improved camping structure to a bumper of a motor vehicle a pair of members 43 are employed which are extended through the open end faces of the angular corner structures at the end of the cot structure at which the end bar 3 is located, and into the hollow interiors of the bars 5 and 21. The members 43 are provided each with a plurality of apertures one of which receives the pin 44' of a locking element 44 that is secured one to the extension 12 and the other to the extension 26 of the cot structures so as to lock said members 43 against unintended independent movement. The locking element 44 is constructed and arranged in the manner hereinbefore described in connection with the locking elements 8. Each of the members 43 has associated therewith a securing means in the form of a bolt 45 having a hook-shaped lower end 45'. The shank of each of the bolts 45 is extended through apertures formed through the associated member 43 and a wing nut 46 is mounted on the screwthreaded upper end portion of said bolt shank as shown in Fig. 7.

When it is desired to secure the cot structure of the improved camping structure to a bumper of a motor vehicle the wing nuts 46 are rotated to lower the hook-shaped lower ends of the bolts 45 to positions below the lower edge of the bumper D of the motor vehicle. The cot structure is then positioned properly with respect to the motor vehicle bumper and the wing nuts are rotated to draw the bolts 45 upwardly so as to clamp the bumper securely between the hook-shaped ends of the bolts and the lower faces of the members 43.

Figure 2:
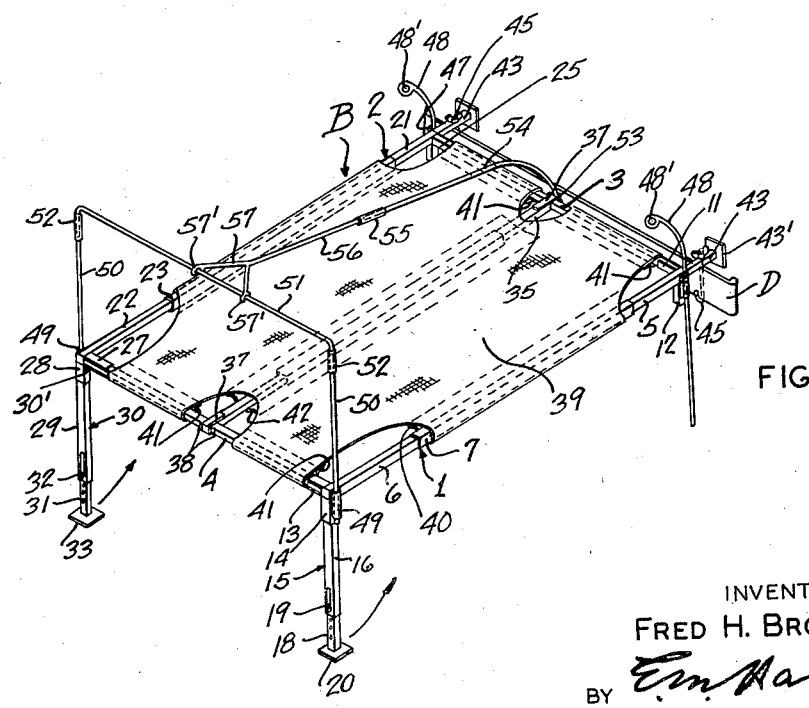
Fig. 2 is a perspective of the improved camping structure with the tent removed.

The hollow extensions 12 and 26 of the cot structure have secured thereto by welding, or otherwise short sleeves 47 which are disposed vertically as shown in Figs. 2 and 3. These sleeves receive rods 48 which are provided with curved upper end portions as shown in Figs. 1 and 2, said rods being extended substantial distances below the lower ends of the sleeves and having pins extended transversely of the rods through openings formed therethrough to provide abutments that contact with the top faces of the sleeves and limit downward movement of the rods relative to the sleeves. Also the extensions 14 and 28 at the opposite end of the cot structure have similar short sleeves 49 secured thereto which support a pair of vertically disposed rods 50, said rods 50 also being provided with transversely extended pins which contact with the top faces of the sleeves 49 and limit downward movement of the rods with respect to the sleeves 49. Supported by the vertical rods 50 is a horizontal rod 51 which has its opposite end portions bent at approximately right angles with respect to the main portion of the rod 51. The angularly bent opposite end portions of the rod 51 have fixed thereto sleeves 52 which receive the upper end portions of the vertical rods 50 so as to support said horizontal rod 51.

The strip of material 37 which embraces the end bar 3 also has a short sleeve secured thereto, this sleeve being designated by the reference character 53. The sleeve 53 receives a rod 54 which is curved upwardly and forwardly from the top of the sleeve and extends to the approximate longitudinal center of the cot structure where it is connected by a sleeve 55 to another rod section 56. The rod section 56 is forked at its forward end as shown at 57 in Fig. 2 and bifurcated ends 57' of the forked portion of said rod section 56 straddle and engage the rod 51. Movement of the rod 54 downwardly with respect to the sleeve 53 is limited by a pin which extends transversely of said rod and engages the top face of said sleeve 53.

The tent C of the improved camping structure is so shaped that it fits the cot structure above and on four sides thereof and is supported in its proper position by the rods 48, 50, 51, 54, and 56. Preferably a pair of suitable snaps are sewed, or otherwise secured on the inner face of the canvas that provides the tent in such position that they may be snapped into the eyes 48' at the upper ends of the rods 48. By this means the corners of the tent at the top and sides thereof will be maintained taut. Also, by preference the opposed sides of the tent are provided with zippers or like fasteners which hold the tent in its proper condition when the tent is closed yet permit of convenient opening of the tent for entry or exit of occupants thereof.

If desired the improved camping structure may be employed apart from a motor vehicle. In this event the members 43 are removed from the positions in which said members are shown in Figs. 2, 3, 4, and 7, and end portions of said members are introduced into the hollow extensions 12 and 26 of the cot structure as suggested by Fig. 9. When the members 43 are so used the locking elements 44 lock said members in association with the hollow extensions by the pins 44' of said locking elements entering the appropriate apertures of the members. Also because the members 43 are provided with foot plates 43' they are prevented from sinking in soft ground when they are employed as legs as described.

When it is desired to collapse the improved camping structure so that it may be stored in the trunk of a motor vehicle or on the running board thereof, or in any other suitable location in or on the motor vehicle, the tent C is removed after the cot structure has been detached from the bumper D, and the rods 48, 50, 51, 54, and 56 are detached from the parts of the cot structure with which they are normally associated. In this connection it is pointed out that the rods 50 may be detached from the rod 51, and the rods 54 and 56 may be detached by merely pulling said associated rods apart, the sleeves 52 and 55 being only in light frictional engagement with the rods 50 and 54. The locking elements associated with side frame assemblies 1 and 2 and the center frame assembly are then operated to permit said assemblies to be telescoped to reduce the lengths thereof slightly. The center frame assembly is then raised to free the strips 37 at the opposite ends thereof from the end bars 3 and 4. The opposite end portions of the end bar 3 are then withdrawn from the portions 11 and 25, and the opposite ends of the end bar 4 are withdrawn from the portions 13 and 27, whereupon said end bars are drawn out of the pockets of the support 39 provided for their reception. The members 43 are then withdrawn from the hollow interiors of the bars 5 and 21 and the legs at the opposite end of the cot structure are swung on their pivots, as suggested by the arrows in Fig. 2, against the side frame assemblies. Next the side frame assemblies and the center frame assembly are telescoped inwardly to their minimum length after which the loose parts are arranged on the support 39 and the entire collapsed structure is rolled from one side toward the other to provide a bundle which, if desired may be suitably tied with a cord or the like. The tent may be rolled with the cot structure or folded or rolled separately as desired.

From the foregoing it is plain that a camping structure is provided which is of simple construction and arrangement and is capable of being conveniently assembled and disassembled as required without the necessity for use of tools of any sort. Also because the improved structure is capable of being reduced to a very compact bundle when collapsed it will occupy very little space when carried on or in a motor vehicle.

I claim:

1. A collapsible camping structure comprising a cot, means for attaching said cot to a bumper of a motor vehicle, said means comprising a pair of members telescopically and detachably associated with said cot and extended from portions thereof and having bumper clamping elements associated therewith, said members being capable of such different association with the cot when said cot is not attached to a bumper of a motor vehicle as to provide legs for the cot.

2. A collapsible camping structure comprising a cot, said cot being provided with a rectangular frame which includes opposed telescopic side frame assemblies, a telescopic center frame assembly, and end bars which are detachably engaged by said telescopic side frame assemblies and by said telescopic center frame assembly, a pair of legs movably attached to said cot frame at one end thereof and adapted for movement to a folded condition relative to said cot frame, and means at the opposite end of said cot frame for releasably connecting said cot frame to a bumper of a motor vehicle, said means comprising a pair of members telescopically and detachably associated with said cot and extended from portions thereof and having bumper clamping elements associated therewith.

3. A collapsible camping structure comprising a cot, said cot being provided with a rectangular frame which includes opposed telescopic side frame assemblies, a telescopic center frame assembly, and end bars which are detachably engaged by said telescopic side frame assemblies and by said telescopic center frame assembly, a pair of legs movably attached to said cot frame at one end thereof and adapted for movement to a folded condition relative to said cot frame, and means at the opposite end of said cot frame for releasably connecting said cot frame to a bumper of a motor vehicle, said means comprising a pair of members telescopically and detachably associated with said cot and extended from portions thereof and having bumper clamping elements associated therewith, said members being capable of such different association with the cot when the cot is not attached to a bumper of a motor vehicle as to provide legs for the cot.

FRED H. BROMSCHWIG.